US008116938B2

(12) United States Patent
Itagaki et al.

(10) Patent No.: US 8,116,938 B2
(45) Date of Patent: Feb. 14, 2012

(54) VEHICLE STATE ESTIMATING APPARATUS, SUSPENSION CONTROL APPARATUS AND SUSPENSION SYSTEM

(75) Inventors: Noriaki Itagaki, Yokohama (JP); Nobuyuki Ichimaru, Yokohama (JP); Takahide Kobayashi, Kawaguchi (JP); Tatsuya Gankai, Chiba (JP); Takanori Fukao, Kyoto (JP)

(73) Assignees: Hitachi Automotive Systems, Ltd., Ibaraki (JP); Kobe University, Kobe (JP)

( * ) Notice: Subject to any disclaimer, the term of this patent is extended or adjusted under 35 U.S.C. 154(b) by 428 days.

(21) Appl. No.: 12/548,736

(22) Filed: Aug. 27, 2009

(65) Prior Publication Data

US 2010/0057297 A1    Mar. 4, 2010

(30) Foreign Application Priority Data

Sep. 1, 2008 (JP) ................................. 2008-223489

(51) Int. Cl.
*B60G 17/018* (2006.01)

(52) U.S. Cl. ........... 701/37; 701/39; 280/5.515; 700/30; 700/31

(58) Field of Classification Search ................ 280/5.515; 700/30, 31

See application file for complete search history.

(56) References Cited

U.S. PATENT DOCUMENTS

| | | | | |
|---|---|---|---|---|
| 4,195,337 A * | 3/1980 | Bertrand et al. | ................ | 700/31 |
| 4,679,136 A * | 7/1987 | Shigemasa | ...................... | 700/30 |
| 4,881,172 A * | 11/1989 | Miller | ............................. | 701/37 |
| 4,907,154 A * | 3/1990 | Yasuda et al. | ................... | 701/37 |
| 5,276,621 A * | 1/1994 | Henry et al. | ..................... | 701/37 |
| 5,434,782 A * | 7/1995 | Henry | ............................. | 701/37 |
| 5,475,596 A * | 12/1995 | Henry et al. | ..................... | 701/37 |
| 5,483,448 A * | 1/1996 | Liubakka et al. | .............. | 701/37 |
| 5,497,324 A * | 3/1996 | Henry et al. | ..................... | 701/37 |
| 5,532,565 A * | 7/1996 | Vervoordeldonk | ........... | 318/610 |
| 5,732,369 A * | 3/1998 | Hirano | .............................. | 701/1 |
| 5,987,367 A * | 11/1999 | Ohsaku et al. | .................. | 701/37 |
| 5,987,368 A * | 11/1999 | Kamimae et al. | .............. | 701/37 |
| 6,298,293 B1 * | 10/2001 | Ohsaku | ........................... | 701/37 |
| 6,314,353 B1 * | 11/2001 | Ohsaku et al. | .................. | 701/37 |
| 6,366,841 B1 * | 4/2002 | Ohsaku | ........................... | 701/37 |
| 6,567,711 B1 * | 5/2003 | Hosek et al. | .................... | 701/37 |
| 7,181,294 B2 * | 2/2007 | Nihei et al. | ..................... | 700/30 |
| 7,277,764 B2 * | 10/2007 | Hovakimyan et al. | .......... | 700/28 |

(Continued)

FOREIGN PATENT DOCUMENTS

JP    2001-287528    10/2001

*Primary Examiner* — Thomas Black
*Assistant Examiner* — Lindsay M Browder
(74) *Attorney, Agent, or Firm* — Wenderoth, Lind & Ponack, LLP

(57) ABSTRACT

A first observer gain of an actual damping force estimating observer 21 calculates a dynamic characteristic compensating signal, and a second observer gain of an actual vehicle model state amount estimating observer 23 calculates a vehicle model compensating signal, from an output deviation corresponding to a difference between a sprung speed (observation output) provided from a vehicle 2 and an estimated sprung speed (estimated observation output) provided from a vehicle approximation model of the actual vehicle model state amount estimating observer 23. The dynamic characteristic compensating signal is input into a dynamic characteristic providing unit of the actual vehicle model state amount estimating observer 23, and is used for adjustment of the setting of the dynamic characteristic providing unit. Therefore, it is possible to curb time lag occurrence in a control, and thereby perform a vibration control with improved accuracy.

20 Claims, 5 Drawing Sheets

U.S. PATENT DOCUMENTS

| | | | |
|---|---|---|---|
| 7,725,201 B2 * | 5/2010 | Zhang et al. | 700/72 |
| 7,747,367 B2 * | 6/2010 | Ono | 701/38 |
| 7,853,338 B1 * | 12/2010 | Hovakimyan et al. | 700/45 |
| 7,983,813 B2 * | 7/2011 | Ummethala et al. | 701/37 |
| 2008/0275575 A1 * | 11/2008 | Scheel et al. | 700/31 |

* cited by examiner

POWER SPECTRUM DENSITY (PSD) OF SPRUNG ACCELERATION

POWER SPECTRUM DENSITY (PSD) OF PISTON SPEED ESTIMATION ERROR

VEHICLE STATE ESTIMATING APPARATUS, SUSPENSION CONTROL APPARATUS AND SUSPENSION SYSTEM

BACKGROUND OF THE INVENTION

The present invention relates to a vehicle state estimating apparatus, a suspension control apparatus and a suspension system for use in a vibration control of a vehicle.

For example, in a suspension control apparatus and a suspension system for use in a vibration control of a vehicle, an observer may be used for estimation of a motion state of the vehicle. Generally, such estimation of a motion state of a vehicle by an observer requires creation of a linear approximation model of the vehicle. In particular, the linear approximation model should have detectability, and an estimated control force input into the vehicle approximation model should be the same as an actual control force input into an actual vehicle. Unsatisfaction with these conditions may result in reduced estimation accuracy or impossibility of estimation.

However, if a suspension control apparatus and a suspension system employ a control suspension which generates variable control force, such as a semiactive damper or an active suspension, it is difficult to estimate a same control force as an actual control force due to the nonlinearity of such a suspension.

As a solution to this problem, there is an apparatus disclosed in Japanese Patent Application Public Disclosure 2001-287528. The apparatus disclosed in Japanese Patent Application Public Disclosure 2001-287528 is characterized in that the nonlinearity of control force of a control suspension [for example, a damping force generated by a semiactive damper and a force generated by an active suspension (a force called an active force, in contrast to a damping force corresponding to a resistance force)] is understood in advance by carrying out experiments, a map for calculating an estimated control force or an approximation function is created based on the experimental data, an estimated control force as close to an actual control force as possible is calculated with use of the map or the function as a control force estimating means, and then a motion state of a vehicle is estimated. In the apparatus disclosed in Japanese Patent Application Public Disclosure 2001-287528, the control force estimating means is a static system.

However, a control suspension is not a static system but a dynamic system. Therefore, time lag occurs relative to an actual control force in the apparatus disclosed in Japanese Patent Application Public Disclosure 2001-287528 since its control force estimating means is a static system. Because time lag occurs in this way, the difference expands between an estimated control force and an actual control force accordingly, as a result of which accuracy of estimating a motion state of the vehicle is reduced and it becomes difficult to provide a desired control effect.

To provide an excellent control effect, accuracy of estimating a motion state of a vehicle should be improved. To improve this accuracy, an actual control force should be estimated in consideration of not only the nonlinearity but also the dynamic characteristic (time lag) of a control suspension.

SUMMARY OF THE INVENTION

An object of the present invention is to provide a vehicle state estimating apparatus, a suspension control apparatus and a suspension system capable of accurately estimating a motion state of a vehicle.

The present invention provides a vehicle state estimating apparatus for use in a vehicle which includes between a sprung side and an unsprung side a control suspension operable to generate a control force, and outputs a first motion state amount, the vehicle state estimating apparatus operable to estimate a second motion state amount of the vehicle, comprising:

a control force estimating unit operable to calculate an estimated static control force based on the static characteristic of the control suspension; and an observer which receives the estimated static control force as an input, the observer comprising a dynamic characteristic providing unit operable to calculate an estimated dynamic control force from the estimated static control force, a vehicle model operable to calculate an estimated first motion state amount and an estimated second motion state amount of the vehicle from the estimated dynamic control force, a dynamic characteristic gain unit operable to calculate a dynamic characteristic compensating signal from an output deviation corresponding to a difference between the first motion state amount provided from the vehicle and the estimated first motion state amount provided from the vehicle model, and a vehicle model gain unit operable to calculate a vehicle model compensating signal from the output deviation;

wherein the dynamic characteristic compensating signal and the vehicle model compensating signal are fed back into the dynamic characteristic providing unit and the vehicle model, respectively.

DETAILED DESCRIPTION OF THE INVENTION

Hereinafter, a semiactive suspension system (suspension system) of a first embodiment of the present invention will be described with reference to the drawings.

Figure 5:
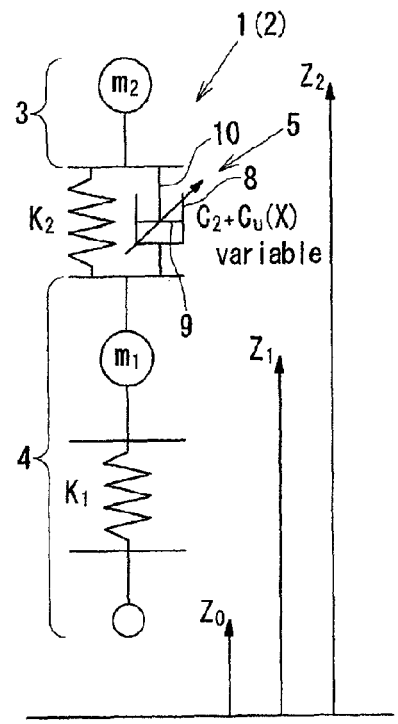
FIG. 5 illustrates a one-wheel model of a vehicle.

Referring to FIGS. 1 to 5, the semiactive suspension system 1 of the first embodiment of the present invention is used by being mounted on a vehicle (hereinafter also referred to as "actual vehicle model") 2 which receives inputs of a road surface disturbance and an actual damping force (actual control force). The semiactive suspension system 1 generally comprises a variable damping force (control force) semiactive damper 5 (control suspension) and a suspension control apparatus 6. The semiactive damper 5 is operable to generate variable damping force (control force) and is disposed between a vehicle body 3 (sprung side) and a wheel 4 (unsprung side) of the vehicle 2. The suspension control apparatus 6 is operable to send an instruction signal to the semiactive damper 5. In the present embodiment, the vehicle 2 has a sprung acceleration sensor 7 which is a constituent component of the suspension control apparatus 6 and is an example of a first motion state amount detecting unit. The vehicle 2 integrates vertical acceleration of the vehicle 2 detected by the sprung acceleration sensor 7, and outputs a sprung speed (first motion state amount of the vehicle 2). Referring to FIG. 5, in the present embodiment, the semiactive damper 5 comprises a piston 9 contained in a main body (damper main body) 8 of the semiactive damper 5, and a piston rod 10 coupled with the piston 9. As shown in FIG. 5, the piston rod 10 is held by the vehicle body 3 and the damper main body 8 is held at the opposite side thereof from the piston rod 10 by the wheel 4 side.

The suspension control apparatus 6 generally comprises a vehicle state estimating apparatus 12 (second motion state amount estimating unit) and a vehicle vibration controller 13. The vehicle state estimating apparatus 12 estimates a speed of the piston 9 (hereinafter also referred to as "piston speed" and "second motion state amount of the vehicle"), and outputs an estimated piston speed. The vehicle vibration controller 13 calculates an instruction signal from a sprung speed (first motion state amount) and a piston speed (second motion state amount). The piston speed corresponds to a relative speed between the sprung side and the unsprung side.

The vehicle vibration controller 13 comprises a feedback controller 14 and an instruction signal calculating unit 15.

The vehicle state estimating apparatus 12 generally comprises a semiactive damper model static system 18 and an observer 20. The semiactive damper model static system 18 includes an estimated static damping force calculating conversion map 17 [damping force (control force) estimating unit] which calculates an estimated static damping force based on the static characteristic of the semiactive damper 5 (control suspension). The observer 20 receives as an input variable the estimated static damping force from the estimated static damping force calculating conversion map 17.

As shown in FIGS. 1 to 4, the observer 20 includes an actual damping force estimating observer 21, an observer 23, observer gains 25 and 26, and a disturbance estimating unit 27. The actual damping force estimating observer 21 calculates an estimated dynamic control force from the estimated static damping force. The observer 23 (hereinafter referred to as "actual vehicle model state amount estimating observer") includes a vehicle model 22 (hereinafter referred to as "vehicle approximation model") operable to calculate an estimated sprung speed (estimated first motion state amount of the vehicle 2) and an estimated piston speed (estimated second motion state amount) from the estimated dynamic control force. The observer gain 25 (hereinafter referred to as "first observer gain") calculates a dynamic characteristic compensating signal L1 from an output deviation corresponding to a difference between a sprung speed (first motion state amount) from the sprung acceleration sensor 7 (vehicle 2) and an estimated sprung speed (also referred to as "estimated observation output" and "estimated first motion state amount of the vehicle 2") from the vehicle approximate model 22 of the actual vehicle model state amount estimating observer 23 (refer to FIG. 2). The observer gain 26 (hereinafter referred to as "second observer gain") calculates a vehicle model compensating signal L2 from the output deviation (refer to FIG. 3). The disturbance estimating unit 27 estimates a road surface disturbance by receiving an input of the output deviation, and outputs the estimated disturbance (refer to FIGS. 1 and 4).

In the present embodiment, the first observer gain 25 constitutes a dynamic characteristic gain unit, and the second observer gain 26 constitutes a vehicle model gain unit. In the present embodiment, for example, the first observer gain 25 may be provided in the actual damping force estimating observer 21 (FIG. 2), and the second observer gain 26 may be provided in the actual vehicle model state amount estimating observer 23 (FIG. 3).

Figure 2:
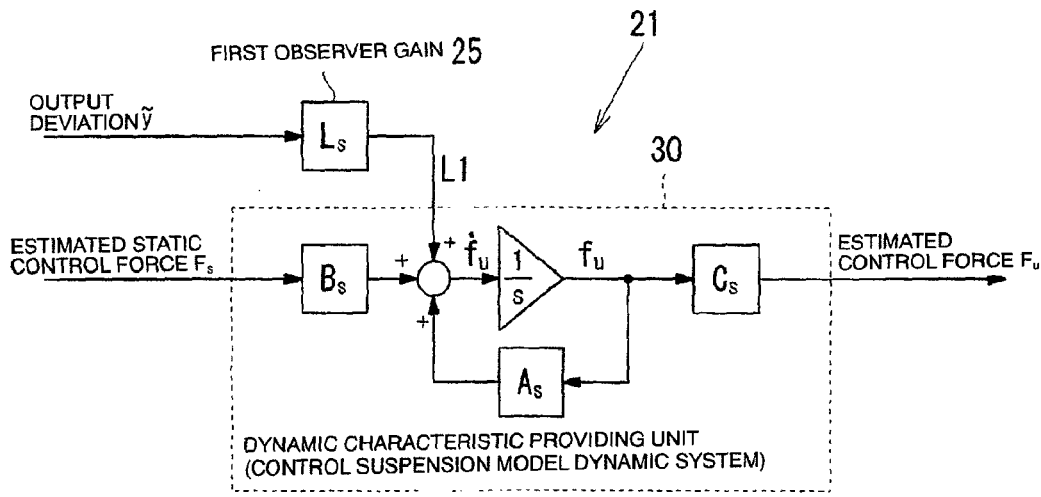
FIG. 2 is a block diagram schematically illustrating an actual damping force estimating observer of FIG. 1.
Figure 3:
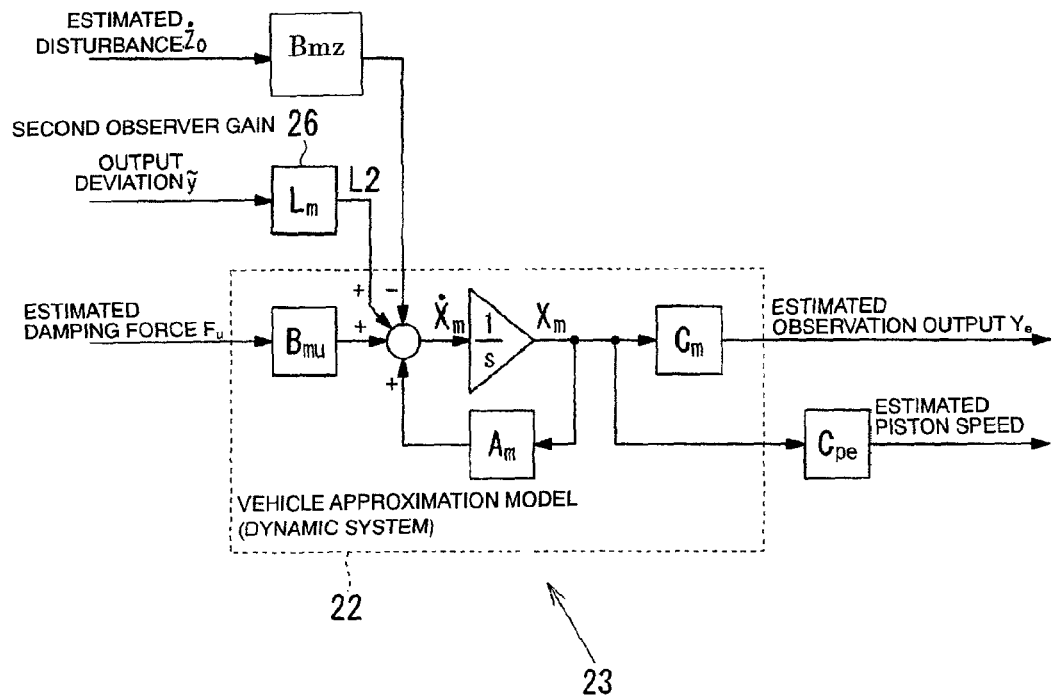
FIG. 3 is a block diagram schematically illustrating an actual vehicle model state amount estimating observer of FIG. 1.
Figure 4:
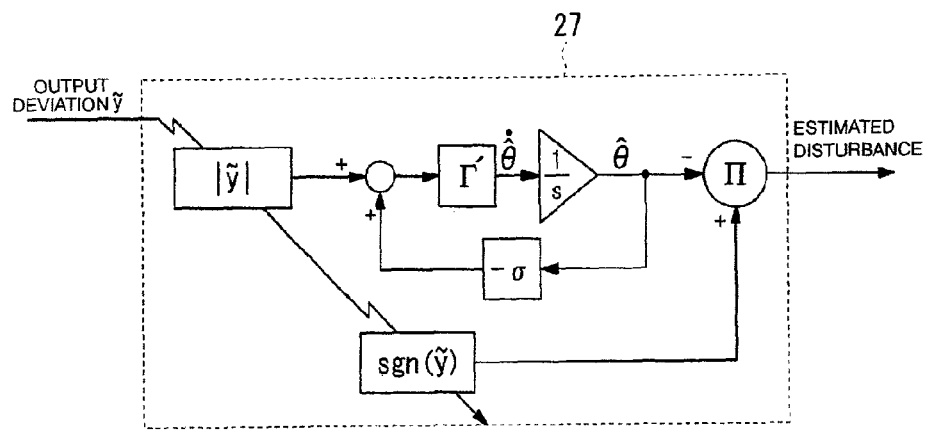
FIG. 4 is a block diagram schematically illustrating a disturbance estimating unit of FIG. 1.

The dynamic characteristic compensating signal L1 is input into a dynamic characteristic providing unit 30 in the actual damping force estimating observer 21 which will be described later, and is used for adjusting the setting of the dynamic characteristic providing unit 30 (FIG. 2). The vehicle model compensating signal L2 is fed back into the vehicle approximate model 22 and is used for adjusting the setting of the vehicle approximate model 22 (FIG. 3).

Figure 1:
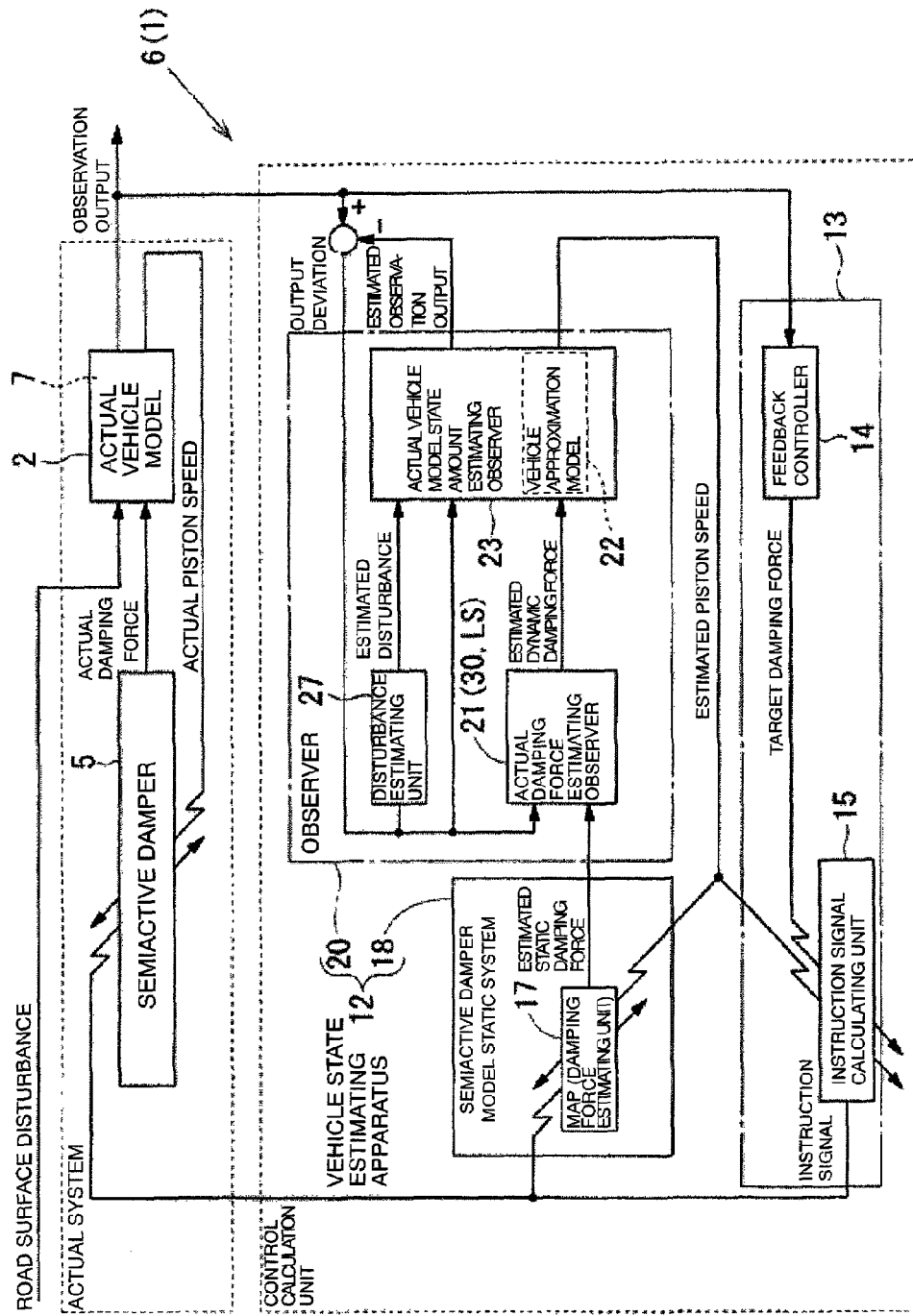
FIG. 1 is a block diagram schematically illustrating a suspension system of an embodiment of the present invention.

As shown in FIG. 1, an observation output (sprung speed and thus damping force) provided from the actual vehicle model is input into the feedback controller 14 in the vehicle vibration controller 13. The feedback controller 14 outputs a target damping force upon receiving an input of the observation output (sprung speed and thus damping force). In the present embodiment, the feedback controller 14 is embodied by a controller suitable for a vibration control that can perform, for example, a skyhook control or an H∞ control.

The instruction signal calculating unit 15 in the vehicle vibration controller 13 calculates an instruction signal from the target damping force provided from the feedback controller 14 and the estimated piston speed (estimated second motion state amount) provided from the actual vehicle model state amount estimating observer 23 (vehicle approximation model 22), and outputs the calculated instruction signal to the semiactive damper 5 and the estimated static damping force calculating conversion map 17 (damping force estimating unit). In the present invention, for example, the instruction signal may be a value of an electric current supplied to an actuator (not shown) operable to change a valve opening pressure or a valve opening degree of an adjustment valve (not shown) of the semiactive damper 5.

The semiactive damper 5 receives an actual piston speed and an instruction signal as inputs, outputs an actual damping force according to the inputs, and transmits it to the actual vehicle model.

An estimated piston speed is calculated by the observer 20 (actual vehicle model state amount estimating observer 23) based on an estimated static damping force calculated by the estimated static damping force calculating conversion map 17 (control force estimating unit), and an output deviation.

As shown in FIG. 2, the actual damping force estimating observer 21 consists of the dynamic characteristic providing unit 30 and the first observer gain 25 having the actual damping force estimating observer gain Ls.

The dynamic characteristic providing unit 30 is a dynamic system approximated by, for example, a first-order lag system or a second-order lag system, based on experimental data of the dynamic characteristic (time lag) of damping force. In the dynamic characteristic providing unit 30, when an output deviation is generated, the estimated damping force is modified by the actual damping force estimating observer gain Ls (first observer gain 25).

As shown in FIGS. 1 and 3, the actual vehicle model state amount estimating observer 23 includes the vehicle approximation model 22, and calculates an estimated observation output and an estimated piston speed through the vehicle approximation model 22 based on an estimated dynamic damping force calculated by the actual damping force estimating observer 21, an output deviation and an estimated disturbance.

In the present embodiment, the observer 20 (the actual damping force estimating observer 21, the actual vehicle model state amount estimating observer 23) is designed as will be described below. In the present embodiment, the observer 20 is designed with respect to a one-wheel model shown in FIG. 5 for each of four wheels, and is used for motion state estimation of the vehicle 2.

A motion equation is derived from the one-wheel model shown in FIG. 5, and the state space representation of the vehicle approximation model 22 is provided as follows.

Here, $m_1$ is an unsprung mass, $m_2$ is a sprung mass, $c_2$ is an invariable damping coefficient between the sprung mass and the unsprung mass, cu is a variable damping coefficient, $Z_0$ is a road surface displacement, $Z_1$ is an unsprung mass change, $Z_2$ is a sprung mass change, $k_1$ is a spring constant of a tire, and $k_2$ is a spring constant of a suspension spring.

$$\dot{x}_m = A_m x_m + B_{mu} F_u + B_{mz} \dot{z}_0$$

$$\dot{y}_m = C_m x_m \qquad (1)$$

where $X_m$ is a state vector as follows:

$$X_m = \begin{bmatrix} Z_2 - Z_1 \\ \dot{Z}_2 \\ Z_1 - Z_0 \\ \dot{Z}_1 \end{bmatrix}, \qquad (2)$$

$A_m$, $B_{mu}$, $B_{mz}$ and $C_m$ are as follows:

$$A_m = \begin{bmatrix} 0 & 1 & 0 & -1 \\ -\frac{k_2}{m_2} & -\frac{c_2}{m_2} & 0 & \frac{c_2}{m_2} \\ 0 & 0 & 0 & 1 \\ \frac{k_2}{m_1} & \frac{c_2}{m_1} & -\frac{k_1}{m_1} & -\frac{c_2}{m_1} \end{bmatrix}, B_{mu} = \begin{bmatrix} 0 \\ -\frac{1}{m_2} \\ 0 \\ \frac{1}{m_1} \end{bmatrix}, \qquad (3)$$

$$B_{mz} = \begin{bmatrix} 0 \\ 0 \\ -1 \\ 0 \end{bmatrix}, C_m = [\,0 \ 1 \ 0 \ 0\,],$$

$y_m$ is an observation output, $F_u$ is an estimated damping force, and $$\dot{Z}_0 \qquad (4)$$

is a road surface speed disturbance.

Next, the dynamic system of the model of the semiactive damper 5 (semiactive damper model) is expressed as follows:

$$\dot{f}_u = A_s f_u + B_s F_s$$

$$F_u = C_s f_u \qquad (5)$$

where $f_u$ is a state vector of damping force, and $F_s$ is a static damping force.

In the present embodiment, as to $A_s$, $B_s$ and $C_s$ in equation (5), approximation by the first-lag order of time constant T brings about the following results; $A_s = -1/T$, $B_s = 1/T$, and $C_s = 1$ (6). Therefore, in the present embodiment, $f_u = F_u$. Then, an augmented system is established from equations (1) and (5), as follows:

$$\begin{bmatrix} \dot{x}_m \\ \dot{F}_u \end{bmatrix} = \begin{bmatrix} A_m & B_{mu} C_s \\ 0_{1\times 4} & A_s \end{bmatrix} \begin{bmatrix} x_m \\ F_u \end{bmatrix} + \begin{bmatrix} 0_{4\times 1} \\ B_s \end{bmatrix} F_s + \begin{bmatrix} B_{mz} \\ 0_{1\times 1} \end{bmatrix} \dot{z}_0 \qquad (7)$$

$$y_m = [\,C_m \ 0_{1\times 1}\,] \begin{bmatrix} x_m \\ F_u \end{bmatrix}.$$

Here, the following substitution is performed:

$$x = \begin{bmatrix} x_m \\ F_u \end{bmatrix} \qquad (8)$$

$$A = \begin{bmatrix} A_m & B_{mu} C_s \\ 0_{1\times 4} & A_s \end{bmatrix}$$

$$B_1 = \begin{bmatrix} 0_{4\times 1} \\ B_s \end{bmatrix}$$

$$B_2 = \begin{bmatrix} B_{mz} \\ 0_{1\times 1} \end{bmatrix}$$

$$C = [\,C_m \ 0_{1\times 1}\,]$$

$$y = y_m.$$

Then, the following equation is obtained:

$$\dot{x} = Ax + B_1 F_s + B_2 \dot{z}_0$$

$$y = Cx \qquad (9)$$

On the basis of equation (9), the observer 20 of this system is established as follows:

$$\dot{\hat{x}} = A\hat{x} + B_1 F_s + L(y - C\hat{x}) - B_2 \{-\hat{\theta} \operatorname{sgn}(y - C\hat{x})\} \qquad (10)$$

where L is an observer gain, and in the present embodiment, is obtained with use of the method based on the steady-state Kalman filter. Here, the observer gain L is expressed as follows:

$$L = [L_m^T L_s^T]^T \qquad (11)$$

$$\hat{\theta} \qquad (12)$$

is an estimated value, when $$|\dot{z}_0| \leq \theta \qquad (13)$$

Now, an error is explained. If $$e = \hat{x} - x \qquad (14)$$

and $$Ce = \tilde{y} \qquad (15)$$

then the following equation is obtained for the error:

$$\dot{e} = (A - LC)e + B_2 \{\dot{z}_0 - \hat{\theta} \operatorname{sgn}(\tilde{y})\} \qquad (16)$$

Firstly, the observer gain L is obtained with use of the method based on the steady-state Kalman filter. When [equation (9)] in which the disturbance is ignored is affected by white Gauss noises w(t) and v(t), the system is expressed as follows:

$$\dot{x} = Ax + B_1 F_s + w(t)$$

$$y = Cx + v(t) \qquad (17)$$

The average value and the covariance matrices Q and R of w(t) and v(t) are set as follows:

$$E[w(t)]=0,$$

$$E[w(t)w(t)T]=Q\delta(t-\pi) \quad (18),$$

$$E(v(t))=0,$$

$$E(v(t)v(t)T)=R\delta(t-\pi) \quad (19),$$

where $E[\bullet]$ is an expectation value, and $\delta$ is a delta function.

The observer gain L is determined from the positive semidefinite symmetric matrix solution P of the Riccati equation $AP+PA^T-PCTR-1CP+Q=0$ (20) as $L=PCTR-1$ (21). Here, y is a vertical motion speed of the vehicle body 3, and is obtained by integration of values detected by the acceleration sensor 7.

Now, using a small value $\alpha$, if $$B'_{mz} = \begin{bmatrix} 0 \\ \alpha \\ -1 \\ 0 \end{bmatrix}, B'_2 = \begin{bmatrix} B'_{mz} \\ 0_{1 \times 1} \end{bmatrix}, B_3 = \begin{bmatrix} 0 \\ \alpha \\ 0 \\ 0 \\ 0 \end{bmatrix}, \quad (22)$$

then $$\dot{e} \quad (23)$$

is modified as follows, assuming $A_0=A-LC$:

$$\dot{e}=A_0 e + B'_2\{\dot{z}_0 - \hat{\theta}\operatorname{sgn}(\tilde{y})\} - B_3 \dot{z}_0 \quad (24)$$

After this modification, there exists a matrix S such that (SC, $A_0$, $B'_2$) are strictly positive realness. Then, there exist symmetric positive definite matrices G and H satisfying the following equations:

$$A_0^T G + G A_0 = -2H$$

$$SC = \dot{B}_2^T G \quad (25)$$

For e, a positive definite Liapunov function is set as follows:

$$V = \frac{1}{2} e^T G e + \frac{1}{2} \Gamma^{-1} \tilde{\theta}^2, \quad (26)$$

where $\Gamma$ is a positive constant value, and $$\tilde{\theta}=\theta-\hat{\theta} \quad (27)$$

The temporal differentiation value of V is as follows:

$$\dot{V} = \frac{1}{2} e^T (A_0^T G + G A_0) e + B'^T_2 G e\{\dot{z}_0 - \hat{\theta}\operatorname{sgn}(\tilde{y})\} - \quad (28)$$

$$\Gamma^{-1} \tilde{\theta}\dot{\hat{\theta}} - \alpha e \dot{z}_0$$

$$= -e^T H e + S\tilde{y}\{\dot{z}_0 - \hat{\theta}\operatorname{sgn}(\tilde{y})\} - \Gamma^{-1}\tilde{\theta}\dot{\hat{\theta}} - \frac{1}{2}\alpha(e+\dot{z}_0)^2 +$$

$$\frac{1}{2}\alpha e^2 + \frac{1}{2}\alpha \dot{z}_0^2$$

$$\leq -e^T (H - G^T B_3 B_3^T G) e - \Gamma^{-1}\tilde{\theta}(\dot{\hat{\theta}} - \Gamma|S||\tilde{y}|) + \frac{1}{2}\alpha \dot{z}_0^2.$$

Here, since S is a constant value, and $\alpha$ is a sufficiently small value, $$\dot{\hat{\theta}} \quad (29)$$

is determined as follows:

$$\dot{\hat{\theta}} = \Gamma|S||\tilde{y}| \quad (30)$$

$$= \Gamma|\tilde{y}|.$$

However, in order to secure boundedness of $$\hat{\theta} \quad (3)$$

modification is performed with use of the $\sigma$-modification method. The result is as follows:

$$\dot{\hat{\theta}}=\Gamma(|\tilde{y}|-\sigma\hat{\theta}) \quad (32)$$

The observer 20 is configured in this way.

In the present invention, the first observer gain 25 (dynamic characteristic gain unit) calculates the dynamic characteristic compensating signal L1, and the second observer gain 26 (vehicle model gain unit) calculates the vehicle model compensating signal L2, based on an output deviation corresponding to a difference between a sprung speed (first motion state amount) obtained by integration of vertical acceleration detected by the sprung acceleration sensor 7 (the vehicle 2), and an estimated sprung speed (estimated first motion state amount of the vehicle) provided from the vehicle approximation model 22 of the actual vehicle model state amount estimating observer 23.

Then, the dynamic characteristic compensating signal L1 is input into the dynamic characteristic providing unit 30, and is used for adjustment of the setting of the dynamic characteristic providing unit 30. As a result, it is possible to curb occurrence of time lag in a control so that a vibration control can be performed with improved accuracy. In addition, the vehicle model compensating signal L2 is fed back into the vehicle approximation model 22, and is used for adjustment of the setting of the vehicle approximation model 22. As a result, it is possible to adjust the content of the vehicle approximation model 22 according to an output deviation so that accuracy of a vibration control can be improved accordingly.

Further, in the present embodiment, since the observer 20 is configured with respect to the augmented system consisting of the dynamic characteristic (time lag) model of the semiactive damper 5 and the vehicle model, it is possible to modify not only an estimated state amount of an vehicle motion (estimated motion state amount) but also an estimated dynamic control force such that it approaches an actual value.

In the present embodiment, since the estimated dynamic control force can approach the actual value, the estimated state amount of the vehicle motion can be more accurately estimated than in conventional methods.

Furthermore, since the estimated state amount of a motion of the vehicle 2 can be estimated with improved accuracy, it is possible to mitigate response of sprung acceleration.

In the present embodiment, use of the observer 20 configured as discussed above establishes the vehicle state estimating apparatus 12 including the actual damping force estimating observer 21, the suspension control apparatus 6 and thus the semiactive suspension system 1.

The present invention is characterized by the provision of the actual damping force estimating observer 21, and due to this characteristic, the present invention can bring about an excellent vibration damping effect by appropriately modifying an estimated damping force, even when a large output deviation is generated.

Figure 6:
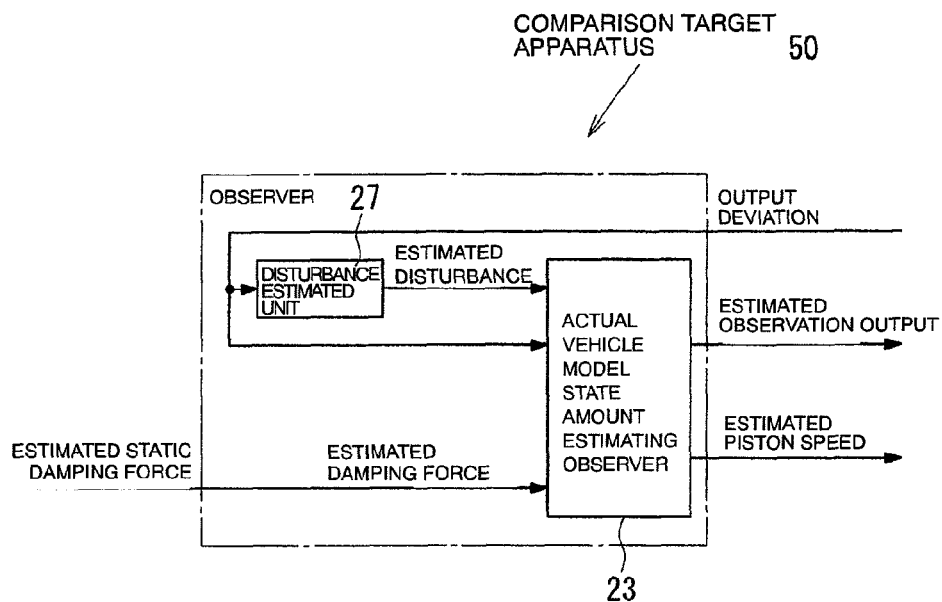
FIG. 6 is a block diagram schematically illustrating a comparison target apparatus.

The inventors of the invention of the present application carried out comparison verification to confirm that the apparatus 6 of the above-mentioned embodiment (comprising the actual damping force estimating observer 21) could bring about the above-mentioned effect. As shown in FIG. 6, an apparatus which does not comprise the actual damping force estimating observer 21 (hereinafter referred to as "comparison target apparatus 50") was prepared to be compared with the apparatus 6 of the above-mentioned embodiment. Then, tests were conducted on the apparatus 6 of the above-mentioned embodiment and the comparison target apparatus 50 (which does not comprise the actual damping force estimating observer 21), and the results thereof were compared. In this comparison verification, the inventors performed shaking simulation by random wave including a frequency component of 0.5 Hz to 20 Hz, and measured the power spectrum density (PSD) of the sprung acceleration and the PSD of the difference between the estimated piston speed and the actual piston speed during this simulation. The results thereof are shown in FIGS. 7 and 8, respectively.

Since the comparison target apparatus 50 does not comprise the actual damping force estimating observer 21, an estimated static damping force is input into the actual vehicle model state amount estimating observer 23 as an estimated damping force without conversion into a dynamic damping force, so that no modification is made to the estimated damping force even when a large output deviation is generated. As a result, the apparatus 50 provides an inferior vibration damping effect.

Figure 7:
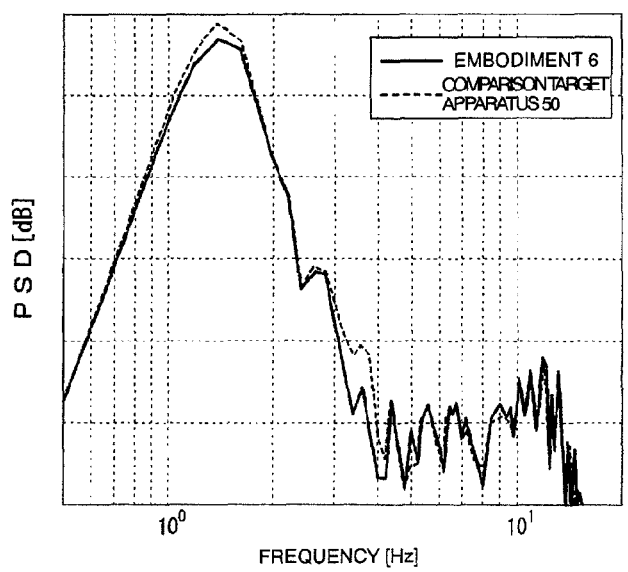
FIG. 7 shows the power spectrum density (PSD) of the sprung acceleration, which is obtained from comparison verification performed on the embodiment and the comparison target apparatus.
Figure 8:
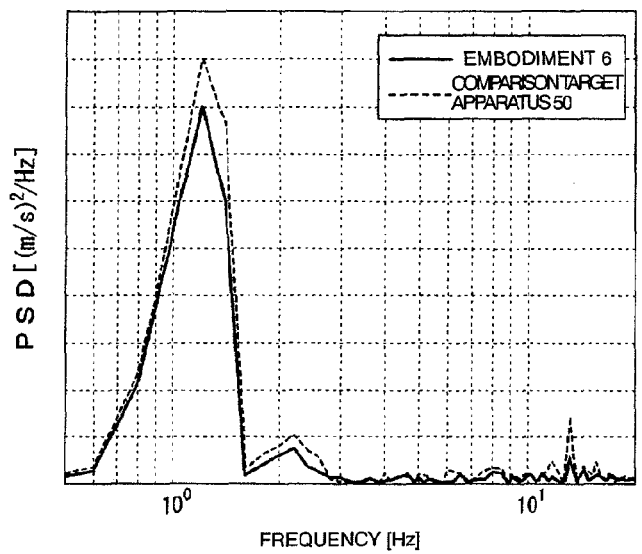
FIG. 8 shows the power spectrum density (PSD) of the piston speed estimation error, which is obtained from comparison verification performed on the embodiment and the comparison target apparatus.

On the other hand, as shown in FIGS. 7 and 8, according to the apparatus 6 of the above-mentioned embodiment, it is possible to reduce the estimation error between the estimated piston speed and the actual piston speed, reduce the power spectrum density of the sprung acceleration, and thereby provide an excellent vibration damping effect.

In the above-mentioned embodiment, the control suspension 5 is embodied by the semiactive damper. However, the present invention is not limited to this embodiment, and the control suspension may be embodied by another type of control suspension such as an active suspension or a roll stiffness control apparatus (for example, active stabilizer). In this case, a so-called active force (control force) generated by an active suspension or a roll stiffness control apparatus may be controlled, instead of controlling a damping force (control force) generated by the semiactive damper 5.

For example, in an embodiment using an active suspension, an instruction signal may be input into the active suspension that is the control suspension, and the observer may output any motion state amount (such as a sprung acceleration of each wheel) that is desired to be estimated. On the other hand, in an embodiment using a roll stiffness control apparatus, an instruction signal may be input into the roll stiffness control apparatus that is the control suspension, and the observer may output any motion state amount (such as a degree of a roll) that is desired to be estimated.

Furthermore, in the above-mentioned embodiment, the observer 20 outputs a sprung speed and a piston speed, and the output sprung speed is compared with an actually measured value. However, if a piston speed can be actually measured with use of, for example, a vehicle height sensor, the output piston speed may be compared with an actually measured value. In addition, an output of the observer 20 is not limited to the above-mentioned embodiment, and the observer 20 may output any motion state amount that is desired to be estimated.

According to the above-mentioned embodiment of the present invention, it is possible to estimate a motion state of a vehicle including a dynamic system with improved accuracy.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention. Moreover, all features of all embodiments and all claims can be combined with each other, as long as they do not contradict each other.

The present application claims priority to Japanese Patent Application No. 2008-223489 filed on Sep. 1, 2008. The entire disclosure of Japanese Patent Application No. 2008-223489 filed on Sep. 1, 2008 including specification, claims, drawings and summary is incorporated herein by reference in its entirety.

What is claimed is:

1. A vehicle state estimating apparatus for use in a vehicle which includes between a sprung side and an unsprung side a control suspension operable to generate a control force, and outputs a first motion state amount, the vehicle state estimating apparatus operable to estimate a second motion state amount of the vehicle, comprising:
   a control force estimating unit operable to calculate an estimated static control force from an input into the control suspension based on the static characteristic of the control suspension; and
   an observer which receives the estimated static control force as an input, the observer comprising
   a dynamic characteristic providing unit operable to calculate an estimated dynamic control force from the estimated static control force,
   a vehicle model operable to calculate an estimated first motion state amount and an estimated second motion state amount of the vehicle from the estimated dynamic control force,
   a dynamic characteristic gain unit operable to calculate a dynamic characteristic compensating signal from an output deviation corresponding to a difference between the first motion state amount provided from the vehicle and the estimated first motion state amount provided from the vehicle model, and
   a vehicle model gain unit operable to calculate a vehicle model compensating signal from the output deviation;
   wherein the dynamic characteristic compensating signal and the vehicle model compensating signal are fed back into the dynamic characteristic providing unit and the vehicle model, respectively.

2. The vehicle state estimating apparatus according to claim 1, wherein the control suspension comprises a semiactive damper.

3. The vehicle state estimating apparatus according to claim 2, wherein the control force is a damping force, and the control force estimating unit calculates an estimated static damping force corresponding to the estimated static control force by receiving as input signals an instruction signal input into the control suspension and an estimated piston speed of the control suspension.

4. The vehicle state estimating apparatus according to claim 2, wherein the first motion state amount is one of a sprung speed and a sprung/unsprung relative speed, and the second motion state amount is the other of the sprung speed and the sprung/unsprung relative speed.

5. The vehicle state estimating apparatus according to claim 1, wherein the control suspension comprise an active suspension.

6. The vehicle state estimating apparatus according to claim 1, wherein the control suspension comprises a roll stiffness control apparatus.

7. The vehicle state estimating apparatus according to claim 1, wherein the dynamic characteristic of the dynamic characteristic providing unit as a dynamic characteristic model of the control suspension is constituted by an n-order lag system, and the observer is designed with respect to an augmented system consisting of the dynamic characteristic model of the control suspension and the vehicle model.

8. The vehicle state estimating apparatus according to claim 7, wherein the n-order lag system is a first-order lag system.

9. A suspension control apparatus operable to send an instruction signal to a control suspension which generates variable control force, comprising:
  a second motion state amount estimating unit operable to estimate at least one second motion state amount of a vehicle which is different from a first motion state amount corresponding to a motion state amount of the vehicle which is output by the vehicle; and
  a vehicle vibration controller operable to calculate the instruction signal based on the first motion state amount and the second motion state amount;
  wherein the second motion state amount estimating unit comprises
  a control force estimating unit operable to calculate an estimated static control force based on the static characteristic of the control suspension, and
  an observer which receives the estimated static control force as an input variable;
  the observer comprises
  a dynamic characteristic providing unit operable to calculate an estimated dynamic control force from the estimated static control force,
  a vehicle model operable to calculate an estimated first motion state amount and an estimated second motion state amount of the vehicle from the estimated dynamic control force,
  a dynamic characteristic gain unit operable to calculate a dynamic characteristic compensating signal from an output deviation corresponding to a difference between the first motion state amount provided from the vehicle and the estimated first motion state amount provided from the vehicle model, and
  a vehicle model gain unit operable to calculate a vehicle model compensating signal from the output deviation; and
  the dynamic characteristic compensating signal and the vehicle model compensating signal are fed back into the dynamic characteristic providing unit and the vehicle model, respectively.

10. The suspension control apparatus according to claim 9, wherein the vehicle vibration controller comprises a skyhook controller or an H∞ controller.

11. The suspension control apparatus according to claim 9, wherein the control suspension comprises a semiactive damper.

12. The suspension control apparatus according to claim 9, wherein the control suspension comprises an active suspension.

13. The suspension control apparatus according to claim 9, wherein the control suspension comprises a roll stiffness control apparatus.

14. The suspension control apparatus according to claim 9, wherein the dynamic characteristic of the dynamic characteristic providing unit as a dynamic characteristic model of the control suspension is constituted by an n-order lag system, and the observer is designed with respect to an augmented system consisting of the dynamic characteristic model of the control suspension and the vehicle model.

15. A suspension system, comprising:
  a control suspension which generates variable control force; and
  a suspension control apparatus operable to send an instruction signal to the control suspension;
  wherein the suspension control apparatus comprises
  a second motion state amount estimating unit operable to estimate at least one second motion state amount of a vehicle which is different from a first motion state amount corresponding to a motion state amount of the vehicle which is output by the vehicle, and
  a vehicle vibration controller operable to calculate the instruction signal based on the first motion state amount and the second motion state amount;
  the second motion state amount estimating unit comprises
  a control force estimating unit operable to calculate an estimated static control force based on the static characteristic of the control suspension, and
  an observer which receives the estimated static control force as an input variable;
  the observer comprises
  a dynamic characteristic providing unit operable to calculate an estimated dynamic control force from the estimated static control force,
  a vehicle model operable to calculate an estimated first motion state amount and an estimated second motion state amount of the vehicle from the estimated dynamic control force,
  a dynamic characteristic gain unit operable to calculate a dynamic characteristic compensating signal from an output deviation corresponding to a difference between the first motion state amount provided from the vehicle and the estimated first motion state amount provided from the vehicle model, and
  a vehicle model gain unit operable to calculate a vehicle model compensating signal from the output deviation; and
  the dynamic characteristic compensating signal and the vehicle model compensating signal are fed back into the dynamic characteristic providing unit and the vehicle model, respectively.

16. The suspension system according to claim 15, wherein the vehicle vibration controller comprises a skyhook controller or an H∞ controller.

17. The suspension system according to claim 15, wherein the control suspension comprises a semiactive damper.

18. The suspension system according to claim 15, wherein the control suspension comprises an active suspension.

19. The suspension system according to claim 15, wherein the control suspension comprises a roll stiffness control apparatus.

20. The suspension system according to claim 15, wherein the dynamic characteristic of the dynamic characteristic providing unit as a dynamic characteristic model of the control suspension is constituted by an n-order lag system, and the observer is designed with respect to an augmented system consisting of the dynamic characteristic model of the control suspension and the vehicle model.

* * * * *